United States Patent [19]

Loontjens

[11] 4,215,013

[45] Jul. 29, 1980

[54] PROCESS FOR THE POLYMERIZATION OF 1-ALKENES

[75] Inventor: Jacobus A. Loontjens, Meerssen, Netherlands

[73] Assignee: Stamicarbon, B.V., Geleen, Netherlands

[21] Appl. No.: 957,003

[22] Filed: Oct. 31, 1978

[30] Foreign Application Priority Data

Nov. 1, 1977 [NL] Netherlands .......................... 7711974

[51] Int. Cl.$^2$ ............................. C08F 4/02; C08F 4/64
[52] U.S. Cl. ............................. 252/429 B; 252/429 C; 526/125
[58] Field of Search .................... 252/429 B, 429 C; 423/498

[56] References Cited

U.S. PATENT DOCUMENTS

| | | | |
|---|---|---|---|
| 1,702,301 | 2/1929 | Jaeger et al. | 423/498 |
| 3,549,717 | 12/1970 | Itakura et al. | 252/429 B X |
| 3,591,656 | 7/1971 | Kroll | 252/429 C X |
| 3,953,414 | 4/1976 | Galli et al. | 252/429 B X |
| 4,107,415 | 8/1978 | Giannini et al. | 252/429 B X |

FOREIGN PATENT DOCUMENTS

| | | | |
|---|---|---|---|
| 223430 | 8/1958 | Australia | 252/429 B |
| 1387890 | 3/1975 | United Kingdom | 252/429 B |

*Primary Examiner*—Patrick Garvin
*Attorney, Agent, or Firm*—Cushman, Darby & Cushman

[57] ABSTRACT

The invention relates to a catalyst system and process for the polymerization of 1-alkenes or the copolymerization of 1-alkenes with each other or with ethylene, wherein use is made of a catalyst system that contains a titanium halogenide component on an at least virtually anhydrous magnesium halogenide support and an organoaluminum component containing a complex of an organic aluminum compound with an ester of an oxygen-containing organic acid characterized in that the support used is a magnesium halogenide that is also at least virtually free of magnesium oxide and which has been prepared by heating a magnesium halogenide containing water and/or magnesium oxide in a gaseous flow of carbon halogenide vapor and/or a mixture of carbon monoxide and a halogen.

The process according to the invention offers a high polymer yield per gram of Ti compound used and with very high contents of isotactic polymer.

14 Claims, No Drawings

PROCESS FOR THE POLYMERIZATION OF 1-ALKENES

This invention relates to a process for the polymerization of 1-alkenes and for the copolymerization of two or more different 1-alkenes with each other, or with ethylene, and particularly to a catalyst system therefor consisting essentially of a titanium halogenide component deposited on, at least, virtually anhydrous magnesium halogenide support composition, and an organoaluminum component composed of a complex of an organic aluminum compound with an ester of an oxygen-containing organic acid.

The polymerization or copolymerization of 1-alkenes (i.e., α-olefines of at least three carbon atoms) is most important for the production of isotactic polymer products. Atactic polymer products are of much less value, in general, and are sometimes nearly a waste by-product. Therefore, a high degree of stereospecificity in such a process is desired.

A process of the type here involved is disclosed in British Patent Specification No. 1,387,890, laid open for public inspection, which describes a catalyst system for the polymerization of 1-alkenes wherein the titanium halogenide component consists of a titanium halogenide on an anhydrous magnesium halogenide support and in which the organoaluminum component used is the product of the addition reaction between a trialkyl aluminum compound and an ester of an oxygen-containing organic acid. A product of the said addition reaction as used in that process usually consists of a mixture of a complex of the trialkyl aluminum compound and of the ester on the one hand and free trialkyl aluminum compound on the other. Such a catalyst system is particularly active in the polymerization of propylene, 1-butene, 4-methyl-1-pentene, and other 1-alkenes, unfortunately, however, the stereospecificity of the resulting process is less than desirable.

Further, in Netherlands Patent Application No. 7509735, also laid open for public inspection, it is disclosed that the organoaluminum component may also contain a dialkyl aluminum halogenide and with the organoaluminum component preferably free of non-complexed trialkyl aluminum compound, as a result of which an improved stereospecificity for the process is attained. However, fully satisfactory results are still not achieved.

Because atactic poly-1-alkenes have a very limited market, there is and has been a need for a method which further reduces the formation thereof as by-products in the preparation of isotactic polymer products.

It has now been found according to the present invention that the stereospecificity of this type of catalyst system can be considerably improved by specifically using as the supporting composition a magnesium halogenide which is not only at least virtually free of water, but which is also at least virtually free of magnesium oxide and which is prepared essentially by heating a magnesium halogenide containing water and/or magnesium oxide in a stream of a carbon halogenide vapor and/or a gaseous mixture of carbon monoxide and a halogen.

Thus, according to the present invention, an improvement is provided for the polymerization or copolymerization of 1-alkenes (i.e., either alone, or with each other or with ethylene) by a novel catalyst system that contains (a) a titanium halogenide component carried on an at least virtually anhydrous magnesium halogenide support and (b) an organoaluminum component containing a complex of an organic aluminum compound with an ester of an oxygen-containing organic acid, and (c) wherein the said support used is a magnesium halogenide which is also at least virtually free of magnesium oxide and which has been prepared by heating a magnesium halogenide containing water and/or magnesium oxide in a gaseous flow of carbon halogenide vapor and/or a mixture of carbon monoxide and a halogen.

The terms "at least virtually anhydrous" and "at least virtually free of magnesium oxide" here denote that the water content of the magnesium oxide in the magnesium halogenide is insignificant, that is below about 0.2% by weight, preferably below about 0.1% by weight, and that the magnesium oxide content is at most about 0.1, preferably at most 0.01, calculated as mgeq of base that can be titrated with a dilute strong acid, e.g., 0.1 N hydrochloric acid, per gram of the magnesium halogenide.

The magnesium halogenide used for this invention is in particular magnesium bromide and/or, preferably, magnesium chloride. The starting material to obtain the same may, however, be any magnesium halogenide initially containing water and/or magnesium oxide, e.g., the commercial products of the general formula $MgCl_2.6\ H_2O$ or $MgCl_2.4\ H_2O$. Preferably, the starting material used is a magnesium halogenide which has first been dehydrated in the conventional way, e.g., the commercial product known as "anhydrous magnesium chloride". Such a product still contains, however, magnesium oxide and residual water in amounts above the requirements of this invention.

This starting material must therefore be heated to a temperature of 300° to 700° C. in a stream of a carbon-halogenide vapor and/or a gaseous mixture of carbon monoxide and a halogen. Such gaseous mixture may for instance, have been obtained from phosgene which, at the reaction temperature has dissociated to a substantial extent into carbon monoxide and chlorine. The carbon halogenide preferably used is carbon tetrachloride or carbon tetrabromide, although use may also be made of other carbon halogenides which are vaporizable at the reaction temperature, such as, e.g., hexachloroethane. By preference, the carbon halogenide contains no more than two carbon atoms per molecule. If so desired, the gaseous mixture can also contain other non-interfering components, e.g., hydrogen halogenides or carbon dioxide, but they are not necessary to the process. The most useful molecular ratio of carbon monoxide and halogen in the gaseous mixture is about 1:1, but other ratios, e.g. between 0,1:1 and 10:1, preferably between about 0,5:1 to 2:1 can be used.

The required heating time is, e.g., from about 5 to about 100 hours, preferably about 10 to about 30 hours.

Similar processes for preparing a magnesium halogenide have been known for a long time and are e.g., described in the old French Pat. No. 1,256,365, U.S. Pat. No. 1,702,301 and German Pat. No. 379,203. However, these publications have nothing to do with the polymerization of 1-alkenes, and the particular support compositions as used herein appear not to have been adopted or recognized as of value in the later-developed polymerization technology.

After the above treatment the magnesium halogenide material is allowed to cool, after which it is incorporated as the support for the titanium component in the catalyst system according to conventional methods.

The catalyst and process according to this invention is used especially for the stereospecific polymerization of 1-alkenes having from 3 to 6 carbon atoms per molecule, such as propylene, 1-butene, 4-methyl-1-pentene and 1-hexene, and in the copolymerization of these 1-alkenes with each other and/or with ethylene. Either copolymers with a random distribution of the various monomer units or block copolymers may be prepared. If ethylene is used as a comonomer, it is usually incorporated in minor amounts, e.g., of at most 30%, particularly between 1% and 15% by weight of the total polymer.

The titanium compound used herein may be any halogenated compound of divalent, trivalent or tetravalent titanium, including compounds in which one or more (but not all) of the halogen atoms is replaced by a hydrocarbyloxy radical on the titanium. Halogens employed are especially chlorine, bromine and iodine, but preferably chlorine. Examples of such compounds are $TiCl_3$, the complex $TiCl_3 \cdot \frac{1}{3} AlCl_3$, $TiCl_4$, $TiBr_4$, $TiI_4$ and $Ti(isobutoxy)_2Cl_2$.

The titanium halogenide is preferably present in the process as a complex with a Lewis base. Although any Lewis base already known as such a catalyst component may be used, preference is given to esters of oxygen-containing organic acids, or more particularly, esters of aromatic carboxylic esters, such as, e.g., ethyl benzoate, ethyl-p-methoxy benzoate, n-butyl benzoate, methyl toluate and dimethyl phthalate. Other examples of suitable esters are esters of saturated aliphatic carboxylic acids, such as, e.g., ethyl acetate, amyl propionate and methyl butyrate, and esters of unsaturated aliphatic carboxylic acids, such as, e.g., methyl methacrylate, ethyl acrylate and dimethyl maleinate. The acid component of the ester usually contains from 1 to 9 carbon atoms per molecule or is a natural fatty acid, while the alcohol component of the esters usually contains from 1 to 6 carbon atoms per molecule. Other examples of suitable Lewis bases are triethyl amine, pyridine, ethylene diamine, nitrobenzene and diethyl ether.

The complexes of a titanium halogenide and a Lewis base can be obtained in any of the already-known ways, e.g., simply by bringing together the components of the complex.

The titanium halogenide may be deposited on the above-described magnesium halogenide support in any known way, e.g., merely by mixing, preferably by grinding, the components together. If use is made of a complex of a titanium halogenide and a Lewis base, it is possible either to first form the complex and then place it on the support, or to first place the uncomplexed titanium halogenide on the support and then to add the Lewis base thereto, either before or after addition of the organoaluminum component. The titanium content of the prepared titanium halogenide component on the support usually ranges between about 0.1% and 10% by weight. The Lewis base content in the titanium halogenide component is usually in an amount of from 0 to about 5 molecules per titanium atom.

The organoaluminum component is typically a complex of an organic aluminum compound, especially a trialkyl aluminum compound, with an ester of an oxygen-containing organic acid particularly an ester of an aliphatically saturated alcohol and a carboxylic acid. Esters which may be used are the same esters as can be used in the preparation of the titanium halogenide component, but here, too, the esters of aromatic carboxylic acids in particular may be used. See the foregoing description thereof.

Suitable trialkyl aluminum compounds are, in particular, triethyl aluminum, tripropyl aluminum, triisobutyl aluminum, triisoprenyl aluminum, trihexyl aluminum, and trioctyl aluminum, although also other trialkyl aluminum compounds may be used. The dialkyl aluminum halogenide used in particular is a chloride or bromide. Diethyl aluminum chloride and bromide are particularly suitable, but use may also be made of other dialkyl aluminum chlorides or bromides with, preferably, from 1 to 10 carbon atoms in the alkyl group, such as, e.g., di-n-butyl aluminum chloride and methyl-n-butyl aluminum chloride.

The organoaluminum component may also contain a non-complexed organoaluminum compound in addition to the complex of an organoaluminum compound with an ester of an oxygen-containing organic acid.

Furthermore, the organoaluminum component preferably contains both a trialkyl aluminum compound and a dialkyl aluminum halogenide compound or a mixture of a dialkyl magnesium compound and a monoalkyl aluminum dihalogenide. The alkyl groups of the organoaluminum compounds preferably each contain from 1 to 10 carbon atoms. The alkyl groups of the dialkyl magnesium compounds preferably contain from 1 to 10 carbon atoms each, or are palmityl or stearyl groups. Examples of suitable dialkyl magnesium compounds are diethyl magnesium, di-n-butyl magnesium, di-n-hexyl magnesium, and di-n-octyl magnesium. The monoalkyl aluminum dihalogenide is preferably a chloride or bromide. Ethyl aluminum dichloride or dibromide is particularly suitable, but use may also be made of other monoalkyl aluminum dihalogenides with, preferably from 1 to 10 carbon atoms in the alkyl group, such as isopropyl aluminum dichloride, n-butyl aluminum dibromide or n-octyl aluminum dichloride.

The molar ratio between the dialkyl magnesium compound and the monoalkyl aluminum dihalogenide may range, e.g., between about 0.1 and 1, preferably between about 0.3 and about 0.6. The use of molar ratios which are too high gives rise to insufficiently stereospecific catalysts, while too low molar ratios lead to insufficient catalyst activity.

The atomic Al/Ti ratio generally ranges between about 10 and 1000; and the molecule/atom ratio of the total amount of bound Lewis base to Ti in the catalyst generally ranges between about 5 and 500.

Use is preferably also made of the stoichiometric amount of ester with respect to the trialkyl aluminum compound, apart from the amount of ester that may be used as a constituent of the titanium halogenide component. Larger or smaller quantities than the stoichiometric amount may be used, but offer no advantages.

The exact stoichiometric amount of ester with respect to the trialkyl aluminum compound can be easily determined by means of microwave titration of the trialkyl aluminum compound with the ester in the way described in Analytical Chemistry 37 (1965), pp. 229–233. Under the polymerization condition used, a normal value for the stoichiometric molar amount of ester with respect to the trialkyl aluminum compound is about 1:1.5. The value found depends on the degree of purity and the concentrations and may range, e.g., from about 1:1.0 to 1:2.0, in particular from about 1:1.2 to 1:1.6.

The conditions under which the polymerization reaction for the 1-alkenes is carried out, employing of the new catalysts for this invention, do not otherwise differ significantly from those already known in the art.

Thus, the reaction may be effected in the gaseous phase or in the presence of a vehicle. The vehicle may be an inert solvent or dispersant or it may be a monomer in the liquid form. Examples of suitable vehicles are aliphatic, cycloaliphatic, aromatic and mixed aromatic-/aliphatic hydrocarbons with 3–8 carbon atoms, such as propylene, 1-butene, butane, isobutane, n-hexane, n-heptane, cyclohexane, benzene, toluene, and the xylenes.

The polymerization temperature usually ranges between −80° and 150° C., preferably between 40° and 100° C. The pressure may range, e.g., between 1 and 30 atmospheres.

If so desired, the molecular weight of the polymer can be controlled during the polymerization, e.g., by effecting the polymerization in the presence of hydrogen or another well-known molecular weight regulator.

In order to prepare block copolymers, any desired sequence of monomer additions may be used, according to already known practices.

The catalyst and process according to the invention is particularly important in the preparation of isotactic polypropylene, of random copolymers of propylene with minor amounts of ethylene, and of block copolymers of propylene and ethylene.

The invention will now be further elucidated with reference to the following non-restricting examples.

EXAMPLE I $MgCl_2.6\ H_2O$ is dehydrated by heating it in a flow of gaseous hydrogen chloride for 10 hours at 100° C., next for 20 hours at 200° C., and finally for 20 hours at 400° C. Analysis shows that the resulting product (Support A) still contains at this point 0.6% by weight of water and 0.02 mgeq. of titratable base per gram of magnesium chloride.

Part of Support A is then heated at 700° C. in a nitrogen atmosphere for 24 hours. Analysis shows that now this product (Support B) contains at most 0.1% by weight of water, but also 0.35 mgeq. of base per gram of magnesium chloride.

Another part of Support A is heated at 700° C. in a gas flow of an equimolar mixture of $Cl_2$ and CO for 24 hours. This product (Support C) now contains ≦0.1% by weight of $H_2O$ and ≦0.01 mgeq. of base per g of magnesium chloride.

Next, 6.5 ml of anhydrous ethyl benzoate, dissolved in 75 ml of anhydrous gasoline (mainly n-hexane), are added at 0° C. to a solution of 5 ml of $TiCl_4$ in 125 ml of gasoline that is purged with dry nitrogen, and the resulting $TiCl_4.C_6H_5COOC_2H_5$ complex precipitates. This precipitate is filtered and dried in a water-free nitrogen atmosphere.

Finally, 0.43 g of the $TiCl_4.C_6H_5COOC_2H_5$ complex and 5.60 grams of Support C are ground together in a stainless-steel ball mill for 17 hours in a nitrogen atmosphere.

Then, 1.3 l. of anhydrous gasoline, 0.62 ml of triethyl aluminum, 0.52 ml of ethyl benzoate, 0.58 ml of diethyl aluminum chloride, and 0.37 g of the ground product obtained using Support C suspended in 50 ml of gasoline are all fed successively to a stainless-steel 2.5-liter autoclave that is provided with a mechanical stirrer and is flushed with dry nitrogen. (The triethyl aluminum and the ethyl benzoate are present in amounts corresponding to the stoichiometry as determined by the microwave titration). After the autoclave has been heated to 60° C., the pressure is raised to 4 atm by means of propylene and is maintained at this value. The polymerization reaction which then ensues is stopped after 1 hour and the white powdery product is isolated by filtration.

The polymerization results are given in Table I.

COMPARATIVE EXPERIMENT 1

The catalyst is prepared in the same way as in Example I, but Support A is used as the support component instead of Support C. The polymerization conditions are the same as those in Example I; the results are again given in Table I.

COMPARATIVE EXPERIMENT 2

The catalyst is prepared in the same way as in Example I, but Support B is used as the support component instead of Support C. The polymerization conditions are the same as those in Example I; the results are again given in Table I.

TABLE I

| Example | mgeq of base/ g of $MgCl_2$ | % by weight of $H_2O$ | Activity g of PP/ mmole of Ti. h.$P_{C_3}$* | % of Soluble Product** |
|---|---|---|---|---|
| I | ≦0.01 | ≦0.1 | 350 | 5.5 |
| Comp. Exp. 1 | 0.02 | 0.6 | 230 | 7.8 |
| Comp. Exp. 2 | 0.31 | ≦0.1 | 315 | 7.4 |

*$P_{C_3}$ denotes the partial pressure of propylene in the reactor; PP stands for polypropylene obtained.
**Polymer that remains dissolved in the polymerization medium, i.e., essentially atactic.

Thus, the process using the catalyst improvement of the present invention decreases the amount of soluble (atactic) polymer to a level of only 71% to 74% of that in the comparative examples. If either the MgO or the $H_2O$ content is too high, production of atactic polymer is also high.

EXAMPLE II

First, $MgCl_2.6\ H_2O$ is dehydrated by heating it in a flow of gaseous hydrogen chloride for 10 hours at 100° C., next for 20 hours at 200° C., and finally for 20 hours at 400° C. Analysis shows that the resulting product (Support D) contains 1.0% by weight of $H_2O$ and 0.05 mgeq. of base per gram of $MgCl_2$.

Part of Support D is then heated at 700° C., in a nitrogen atmosphere for 24 hours. This product (Support E) now contains ≦0.1% by weight of $H_2O$ and 0.38 mgeq. of base per gram of $MgCl_2$.

Another part of Support D is heated at 700° C. in a flow of an equimolar mixture of $Cl_2$ and CO for 24 hours. This product (Support product F) now contains ≦0.1% by weight of $H_2O$ and ≦0.01 mgeq. of base per gram of $MgCl_2$.

0.44 gram of the $TiCl_4.C_6H_5COOC_2H_5$ complex (prepared as described in Example I) and 5.75 grams of Support F are ground together in a stainless steel ball mill for 17 hours in a nitrogen atmosphere.

1.3 l. of anhydrous gasoline, 0.62 ml of triethyl aluminum, 0.52 ml of ethyl benzoate, 0.58 ml of diethyl aluminum chloride and 0.35 g of the above ground product using Support F suspended in 50 ml of gasoline are fed successively to a stainless-steel 2.5-liter autoclave that is provided with a mechanical stirrer and is flushed with dry nitrogen. After the pressure in the autoclave has been raised to 4 atm by means of propylene, the temperature is raised to 60° C. and the pressure and the temperature are kept constant. The polymerization is stopped after 1 hour and the white powdery product is isolated by filtration.

The polymerization results are given in Table II.

COMPARATIVE EXPERIMENT 3

The catalyst is prepared in the same way as in Example II, but Support D is used as the support component instead of Support F. The polymerization conditions are the same as those in Example II. The results are given in Table II.

COMPARATIVE EXPERIMENT 4

The catalyst is prepared in the same way as in Example II, but Support E is used as the support component instead of Support F. The polymerization conditions are the same as those in Example II. The results are now given in Table II.

TABLE II

| Example | mgeq of base/ g of $MgCl_2$ | % by weight of $H_2O$ | Activity g of PP/ mmole of $Ti.h.P_{C3}$ | % of Soluble Product |
|---|---|---|---|---|
| II | ≦0.01 | ≦0.1 | 420 | 5.6 |
| Comp. Exp. 3 | 0.05 | 1.0 | 330 | 7.2 |
| Comp. Exp. 4 | 0.38 | ≦0.1 | 420 | 7.6 |

Here again, using the catalyst of the present invention in the polymerization process resulted in the formation of only 74% to 78% of soluble polymer as compared to that formed in the comparative examples. Again, if either the water content or the MgO content was higher than according to this invention, formation of soluble polymer also increased.

EXAMPLE III

The catalyst is prepared in the same way as in Example II, but here 1.92 g of the $TiCl_4.C_6H_5COOC_2H_5$ complex are ground with 3.78 g of Support F.

The polymerization is effected in a similar way to that in Example II, except that the autoclave is now fed with 1.3 l. of anhydrous gasoline, 3.1 ml of triethyl aluminum, 2.6 ml of ethyl benzoate, 2.9 ml of diethyl aluminum chloride, and 0.50 g of the ground product suspended in 50 ml of gasoline.

The polymerization results are given in Table III.

COMPARATIVE EXPERIMENT 5

The catalyst is prepared in the same way as in Example III, but Support D is used as the support component instead of Support F. The polymerization conditions are the same as those in Example III. The results are given in Table III.

COMPARATIVE EXPERIMENT 6

The catalyst is prepared in the same way as in Example III, but Support E is used as the support component instead of Support F. The polymerization conditions are the same as those in Example III. The results are given in Table III.

TABLE III

| Example | mgeq of base/ g of $MgCl_2$ | % by weight of $H_2O$ | Activity g of PP/ mmole of $Ti.h.P_{C3}$ | % of Soluble Product |
|---|---|---|---|---|
| III | ≦0.01 | ≦0.1 | 220 | 4.0 |
| Comp. Exp. 5 | 0.05 | 1.0 | 180 | 5.0 |
| Comp. Exp. 6 | 0.38 | ≦0.1 | 130 | 5.7 |

In this instance, the results of the present invention showed that only 70% to 80% as much soluble product was formed than in the comparative examples.

EXAMPLE IV

The catalyst is prepared in the same way as in Example II, but here 1.76 g of the $TiCl_4.C_6H_5COOC_2H_5$ complex are ground with 3.42 grams of Support F.

The polymerization is effected in a similar way to that in Example II, except that the reactor is now fed successively with 1.3 l. of gasoline, 0.62 ml of triethyl aluminum, 0.52 ml of ethyl benzoate, 0.58 ml of diethyl aluminum chloride, and 0.11 g of the ground product suspended in 50 ml of gasoline.

The average polymerization activity is 200 g of PP/mmole of $Ti.h.P_{C3}$ and the content of material soluble in the polymerization medium is only 2.1%.

EXAMPLE V

The catalyst is prepared in the same way as in Example II, but here 2.18 grams of the $TiCl_4.C_6H_5COOC_2H_5$ complex are ground with 3.04 grams of Support F.

The polymerization is effected in a similar way to that in Example II, except that the autoclave is now fed successively with 1.3 l. of anhydrous gasoline. 0.62 ml of triethyl aluminum, 0.52 ml of ethyl benzoate, 0.58 ml of diethyl aluminum chloride, and 0.082 g of the ground product suspended in 50 ml of gasoline.

The average polymerization activity is 200 g of PP/mmole of $Ti.h.P_{C3}$ and the content of polymer soluble in the polymerization medium is only 2.2%.

EXAMPLE VI

The catalyst is prepared in the same way as in Example II, but here 2.64 grams of the $TiU_4.C_6H_5COOC_2H_5$ complex are ground with 2.52 grams of Support F.

1.3 l of anhydrous gasoline, 1.90 ml of tri-n-butylaluminium, 0.75 ml of ethyl benzoate and 0.067 g of the above ground product using Support F suspended in 50 ml of gasoline are fed successively to a stainless-steel 2.5 liter autoclave that is provided with a mechanical stirrer and is flushed with dry nitrogen. After the pressure in the autoclave has been raised to 7 atm. by means of propylene, the temperature is raised to 60° C. and the pressure and the temperature are kept constant. The polymerization is stopped after 2 hours and the white powdery product is isolated by filtration.

The average polymerization activity is 135 grams of pp/mmole of $Ti.h.P_{C3}$ and the content of material soluble in the polymerization medium is 4.5.7.

EXAMPLE VII

The catalyst is prepared in the same way as in Example IV. The polymerization is effected in the same way as in Example II, except that the autoclave is now fed successively with 1.3 l. of anhydrous gasoline, 6 ml of a 3.88 molar solution of triisobutyl aluminum in gasoline, 1.7 ml of a 7 molar solution of ethyl benzoate in gasoline, and 0.085 g of the ground product suspended in 50 ml of gasoline.

The average polymerization activity is 370 grams of PP/mmole of Ti.h.P$_{C3}$ and the content of material soluble in the polymerization medium is 4.3%.

What is claimed is:

1. An improved catalyst system for the polymerization and copolymerization of 1-alkenes which contains a titanium halogenide component supported on a magnesium halogenide material and an organoaluminum component containing a complex of an organic aluminum compound with an ester of a carboxylic organic acid, and wherein the magnesium halogenide has at most about 0.2% H$_2$O by weight and at most about 0.1 mgeq magnesium oxide per g of magnesium halogenide, and which has been prepared by heating a magnesium halogenide containing water and/or magnesium oxide in a gaseous flow of a carbon halogenide vapor and/or of a mixture of carbon monoxide and a halogen.

2. The catalyst according to claim 1, wherein the amount of water in the magnesium halogenide is at most 0.1% by weight and the amount of magnesium oxide at most 0.01 mgeq per g of magnesium halogenide.

3. The catalyst according to claims 1 or 2, wherein the magnesium halogenide is magnesium chloride.

4. The catalyst according to claim 1, wherein the titanium halogenide component consists of a complex of a halogenated titanium compound with a Lewis base on magnesium chloride support.

5. The catalyst according to claim 4, wherein the Lewis base that forms a complex with the titanium compound is an ester of an organic carboxylic acid.

6. The catalyst according to claim 5, wherein an ester of an aromatic carboxylic acid is used.

7. The catalyst according to claim 1, wherein the organoaluminum component contains a complex of a trialkyl aluminum compound and an ester of an organic carboxylic acid.

8. The catalyst according to claim 1, wherein the organoaluminum component also contains a non-complexed organoaluminum compound in addition to the complex of an organic aluminum compound with an ester of an organic carboxylic acid.

9. The catalyst according to claims 1 or 8, wherein the organoaluminum component contains both a trialkyl aluminum compound and a dialkyl aluminum halogenide.

10. The catalyst according to claim 1, wherein the organoaluminum component contains both a trialkyl aluminum compound and a mixture of a dialkyl magnesium compound and a monoalkyl aluminum dihalogenide.

11. An improved titanium halogenide catalyst component for use in catalyst systems for the polymerization and co-polymerization of 1-alkenes which consists essentially of a titanium halogenide component supported on a magnesium halogenide material, wherein the magnesium halogenide has at most about 0.2% H$_2$O by weight and at most about 0.1 mgeq magnesium oxide per g of magnesium halogenide, and which has been prepared by heating a magnesium halogenide containing water and/or magnesium oxide in a gaseous flow of a carbon halogenide vapor and/or of a mixture of carbon monoxide and a halogen.

12. A catalyst component according to claim 11, wherein the amount of water in the magnesium halogenide is at most 0.1% by weight and the amount of magnesium oxide at most 0.01 mgeq per g of magnesium halogenide.

13. A catalyst component according to claims 11 or 12 wherein a magnesium halogenide is magnesium chloride.

14. A catalyst component according to claim 11 wherein the titanium halogenide component consists of a complex of a halogenated titanium compound with a Lewis base on magnesium chloride support.

* * * * *